United States Patent [19]
Black

[11] 3,818,339
[45] June 18, 1974

[54] AMPLITUDE COMPARISON CIRCUIT
[75] Inventor: Dewie E. Black, Dearborn Heights, Mich.
[73] Assignee: Burroughs Corporation, Detroit, Mich.
[22] Filed: June 7, 1973
[21] Appl. No.: 368,068

Related U.S. Application Data
[62] Division of Ser. No. 280,267, Aug. 14, 1972, Pat. No. 3,769,580.

[52] U.S. Cl. ............................................ 324/140 R
[51] Int. Cl. ............................................ G01n 7/00
[58] Field of Search ................. 324/102 P, 140, 119

[56] References Cited
UNITED STATES PATENTS
1,966,047  7/1934  Ryall................................. 324/119

OTHER PUBLICATIONS
Prensky, "Electronic Instrumentation," Prentice Hall, p. 131 & 132.

Primary Examiner—Alfred E. Smith
Attorney, Agent, or Firm—Michael B. McMurray; Edwin W. Uren; Edward G. Fiorito

[57] ABSTRACT

An electronic circuit for measuring and comparing the amplitude of a plurality of out of phase signals. The amplitude measurements are accomplished by converting the signals to direct current voltages which equal the peak-to-peak amplitude of the signals. These direct current voltages are then compared electronically to a precision reference voltage which equals the peak-to-peak amplitude of a referenced signal. Direct measurements are then taken of the attenuation of the tested signals by reading the direct current voltages. Additional circuity is provided to make a pass-fail decision automatically where certain limits have been established for the attenuation of the signals to be tested.

6 Claims, 7 Drawing Figures

AMPLITUDE COMPARISON CIRCUIT

CROSS REFERENCE TO RELATED APPLICATION

This application is a divisional of Ser. No. 280,267 filed Aug. 14, 1972 now U.S. Pat. No. 3,769,580 entitled Delay Line Attenuation Tester.

BACKGROUND OF THE INVENTION

The invention disclosed herein relates to testing the amplitude attenuation of signals that are out of phase with each other such as those produced by delay line circuits. Delay line circuits have found many applications including use in computer memories wherein the timing considerations of signals are extremely important. In many applications it is critically important that, in addition to each signal being delayed the specified amount of time, the signal passing through a particular delay line circuit not be attenuated more than a certain percentage of either the input signal nor with respect to any other delay line signal. Since the tolerances for many applications of delay lines are quite strict, it has become necessary to develop methods of measuring the amount of attenuation.

The most common method of measuring the amplitude of out of phase signals has involved the use of an oscilloscope. Using the oscilloscope for this purpose has several disadvantages, however, including: excessive tolerances within the oscilloscope for measuring signal amplitudes; poor resolution, adding to the difficulty of making precise measurements; and the significant possibility of the displayed values being misinterpreted even by skilled engineers and technicians. Another very basic disadvantage of using an oscilloscope for making these types of measurements has to do with the nature of the process itself which is very slow and tedious.

SUMMARY OF THE INVENTION

The elements in the circuit for measuring and comparing the amplitude of out of phase signals are designed to provide an impedance load to the signal sources matching the load to which the signals will ultimately be applied. The signals from the signal source are then amplified, thus reproducing precisely the output signal. These reproduced signals are rectified and filtered and the DC components of each signal are applied to a differential amplifier. A correction voltage is added to compensate for the voltage drop across the filter and rectifying circuits. The direct current components of each signal are then combined in differential amplifiers to form a DC voltage which equals the peak-to-peak value for each output signal.

The attenuation of the output signal through a test device line may be directly measured by comparing the direct current voltage representation of the output of the test device with a reference voltage which equals the peak-to-peak value of the test device input signal. To provide for automatic testing of the output signal, the direct current representation of each test device output signal is connected to a comparator circuit along with a voltage that represents a percentage of the peak-to-peak amplitude of the test device input signal. This circuit provides an output signal whenever the test device output signal falls below the selected attenuation limits of the input signal. The output signal from this test may then be used to light a lamp or to sound an alarm, thus indicating that the test device attenuation exceeded specifications.

The comparison of two test device signals to one another is accomplished by applying both of the direct current voltages representing the test device output signals to another circuit element producing a voltage that is equal to the exact difference between the peak-to-peak amplitudes of each of the delay line output signals. This difference voltage is then applied to a comparator circuit. The comparator circuit will then compare the absolute value of the difference voltage to a reference voltage that represents the maximum allowable difference between the amplitude of the two test device output signals. When the absolute value of the difference voltage exceeds the reference voltage, the comparator circuit will produce a signal indicating the test devices do not meet the specification.

It is accordingly an object of the invention to provide a highly accurate means of measuring the amplitude of a plurality of out of phase signals.

It is a further object of the invention to provide a means for measuring the amplitudes of a plurality of signals with respect to specified limits automatically without operator intervention.

It is a further object of the invention to provide a means of measuring the amplitude of a plurality of out of phase signals to a reference voltage and to each other simultaneously.

DESCRIPTION OF THE PREFERRED EMBODIMENT

Figure 1:
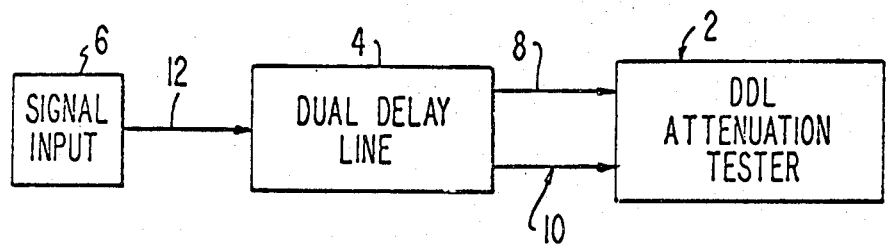
FIG. 1 is a block diagram illustrating the relationship of a delay line attenuation tester to a dual delay line.

The preferred embodiment of the signal comparison circuitry disclosed herein has been designed to accept and test the output signals of a dual delay line. In this configuration there is a signal input signal to the dual delay line and two output signals each delayed by a different amount of time. FIG. 1 is a block diagram illustrating a delay line attenuation tester 2 as it would be used in a test environment in connection with a dual delay line 4 and an input signal source 6. A representative example 4 of a dual delay line that would be used in a computer memory is shown in FIG. 1. The dual delay line responds in an input signal 12 in the range of 2.0 volts peak-to-peak and having a frequency of 50 KHZ to 500 KHZ, with output signals 8 and 10 that are delayed by 400 nanoseconds and 1500 nanoseconds respectively. It is for use with a dual delay line of these general specifications that the preferred embodiment is directed.

Figure 2:
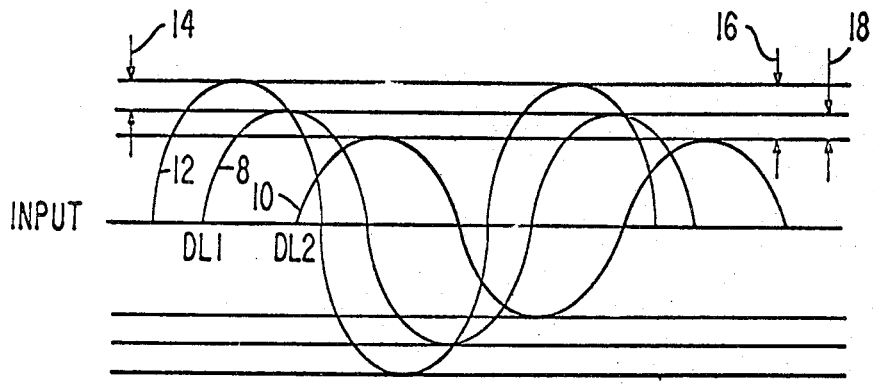
FIG. 2 is a graphical representation of the output signals of a test device with respect to the input signal.

The relationship between the input signal 12 and the output signals 8 and 10 of the dual delay line 4 are shown in FIG. 2. As illustrated in FIG. 2, the output signals of the dual delay lines 8 and 10 will be out of phase with the input signal 12. In addition, there will be a certain attenuation of the amplitude of the output signals of the dual delay line as the signals pass through the delay line circuitry. It is this peak-to-peak attenuation of the output signals amplitude that the comparison circuitry of FIG. 1 has been developed to measure. As shown in FIG. 2, there are three measurements to be taken: the first is the amount of attenuation between the input signal 12 and the first output signal 8, which is shown by the arrows at 14; the second is the attenuation between input signal 12 and the second output signal 10, as shown by the arrows at 16; and finally a measure of the difference in amplitude between the two output signals 8 and 10 as shown by the arrows 18. It was for the purpose of measuring the amplitudes of the output signals 8 and 10 with respect to both the input signal 12 and with respect to each other that the comparison circuitry 2 of FIG. 1 was developed.

The comparison circuitry should have an input impedance which substantially matches the input impedance or load which will be placed upon the test device in actual use. This impedance matching may be accomplished by the circuit illustrated in FIG. 3. Since there are two outputs from the dual delay line 4, each output 8, 10 is connected to a parallel combination of a resistor 20 and a capacitor 22 and then to one input of a two input differential amplifier 24. The resistor and capacitor are shunted across this input to ground. The function of the differential amplifier is to precisely reproduce the output signal from the dual delay line and it is for this purpose that the output of the differential amplifier is coupled back to the second input. The parameters of the resistors and capacitors together with the high input impedance of the differential amplifier are selected to produce a load which will match the load to be placed across the dual delay line during actual operation.

Figure 3:
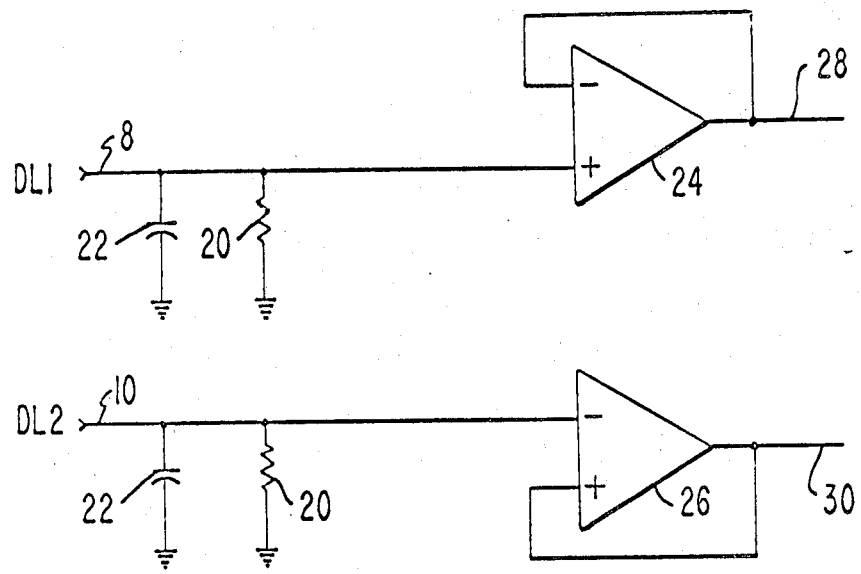
FIG. 3 is a schematic diagram of circuitry for reproducing output signals.
Figure 4:
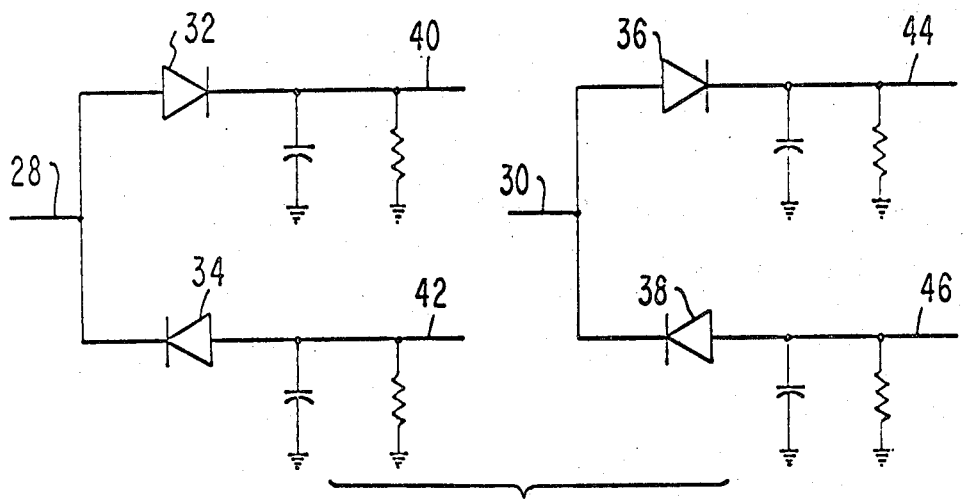
FIG. 4 is a schematic diagram of the circuitry for rectifying and filtering the output signals.

The outputs 28 and 30 of the signal reproduction amplifiers 24 and 26 as shown in FIG. 3 are then applied to the standard full wave rectifier filter circuits shown in FIG. 4. The reproduced dual delay line output signals 28 and 30 are then rectified and filtered by the diodes 32, 34, 36 and 38 and associated circuitry of the full wave rectifier-filter shown in FIG. 4 into their DC components on lines 40, 42, 44 and 46. These DC voltages are in turn used as inputs to the differential amplifiers 48, 50, 52 and 54 that are illustrated in FIG. 5.

Figure 5:
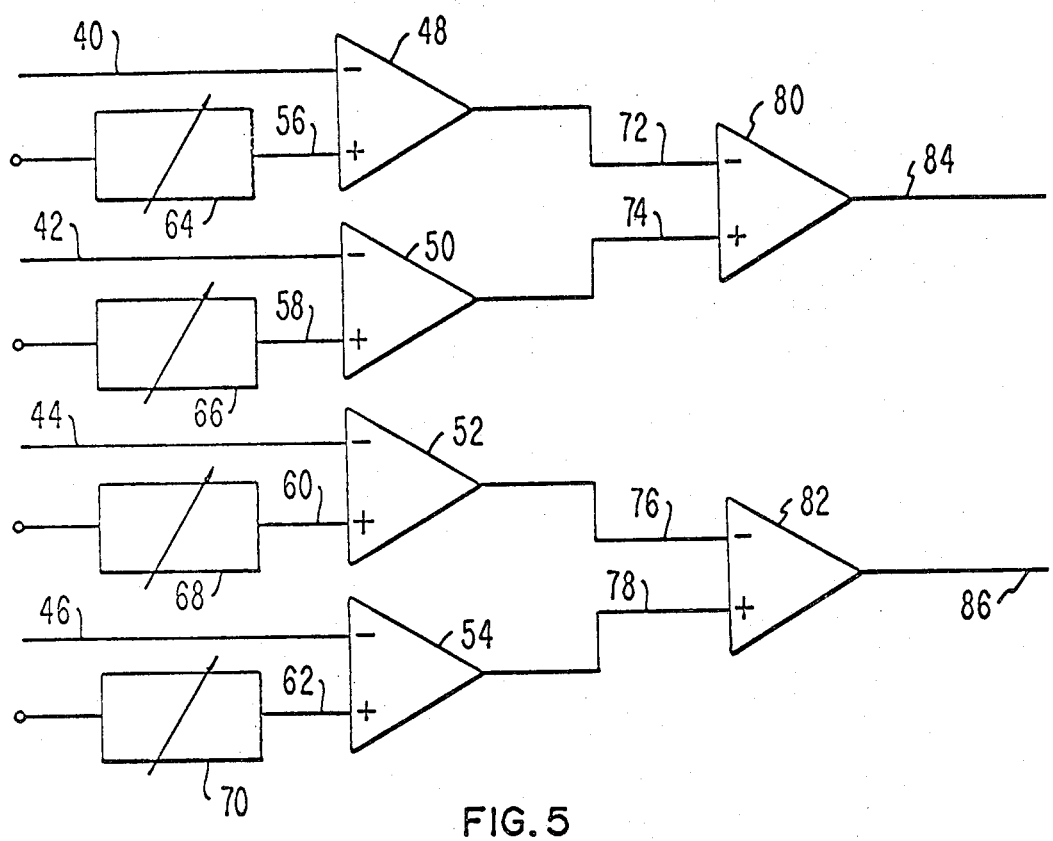
FIG. 5 is a schematic diagram of the circuitry used to generate a voltage representing the peak-to-peak amplitude of the output signal.

In addition to the rectified and filtered components of the dual delay line output signals 40, 42, 44 and 46, that are applied to the negative input of differential amplifiers 48, 50, 52 and 54 of FIG. 5, correction voltages 56, 58, 60 and 62 are provided at the positive input of the differential amplifiers to compensate for the voltage drop across the rectifier-filter circuits shown in FIG. 4. These correction voltages are provided by variable voltage sources 64, 66, 68 and 70 as shown in FIG. 5.

After the DC components of the dual delay line output signals have been corrected for voltage drops across the rectifier-filter circuits, the DC compensated or corrected components 72, 74, 76 and 78 are applied to a second set of differential amplifiers 80 and 82 of FIG. 5. These two amplifiers add the DC component of each output signal together, thus producing a DC voltage that equals the peak-to-peak amplitude of the dual delay line output signals 8 and 10 of FIG. 1. It is at this point that direct measurement of the attenuation of the signal through the dual delay line may be taken by using a direct current voltage reading device to compare the voltages 84 and 86 with the peak-to-peak value of the amplitude of the input signal 12 of FIG. 1. It is by this method that a measure of the attenuation of the signals through the dual delay line can be taken both with respect to the input signal and with respect to each other.

Figure 6:
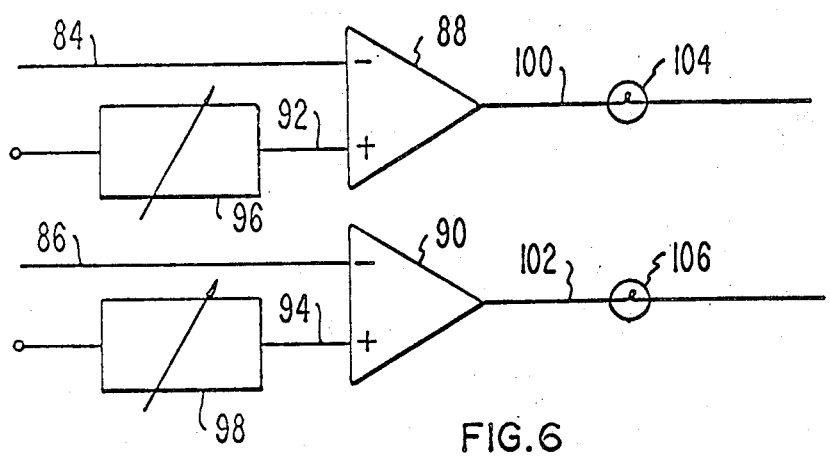
FIG. 6 is a schematic diagram illustrating the circuitry for comparing the output signal to a reference voltage.
Figure 7:
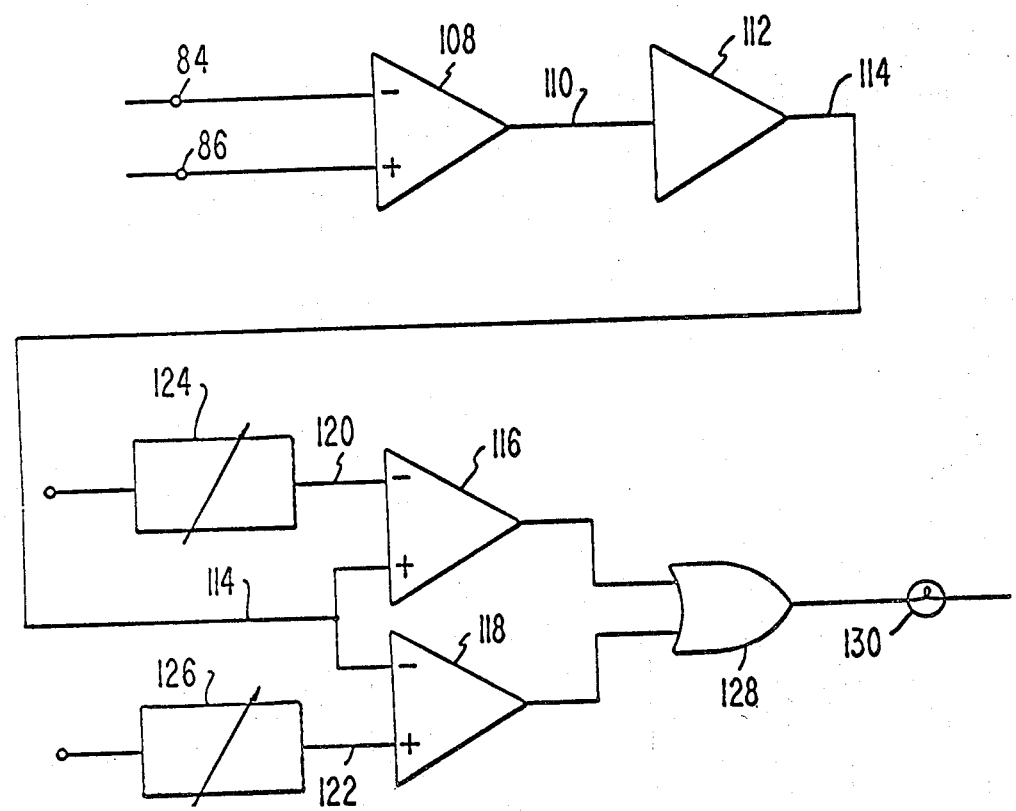
FIG. 7 is a schematic diagram illustrating the circuitry for comparing one output signal to another output signal.

Since one of the objectives of this invention is to provide automatic method for determining the acceptable limits of attenuation of a dual delay line, the circuitry as illustrated in FIG. 6 and FIG. 7 has been provided to perform that function. The circuitry in FIG. 6 takes the direct current representation of the peak-to-peak voltage of the dual delay line outputs 84 and 86 and utilizes them as inputs into negative terminals of the differential amplifiers 88 and 90 of FIG. 6. In addition to the direct current representations 84 and 86 of the dual delay line output signal, voltages 92 and 94, which represent the acceptable limits of voltage attenuation of the input signal, are applied to the positive terminals of the differential amplifiers 88 and 90 of FIG. 6. For example, if the input signal 12 of FIG. 1 has a peak-to-peak voltage of 2.0 volts and the permitted attenuation of the dual delay line outputs 8 and 10 of FIG. 1 is 10 percent of the input signal, a direct current voltage of 1.8 volts is placed into the differential amplifiers 88 and 90 of FIG. 6. This is accomplished by using adjustable voltage sources 96 and 98. Therefore, in this example, when either of the peak-to-peak amplitudes of the dual delay line output signals 8 and 10 of FIG. 1 exceeded a 10 percent attenuation factor, i.e. less than 1.8 volts, a positive signal 100 or 102 would be generated by the differential amplifier 88 or 90. The resulting positive signals 100 and 102 could be used to activate an indicating device 104 or 106, such as a lamp, thereby notifying an operator which of the outputs from the delay line has fallen below the test limits.

Along with comparing the attenuation of each output of the dual delay line to a reference voltage as described above, it may also be desirable to automatically compare the attenuation of the outputs of the dual delay line to each other. It is for that purpose that the circuitry shown in FIG. 7 is provided. In order that the percentage difference between the outputs of the dual delay lines may be measured, the voltages 84 and 86 of FIG. 5 that represent the peak-to-peak amplitude of each of the dual delay line output signals are applied to a differential amplifier 108 of FIG. 7. This amplifier will produce a voltage 110 that is equal to the difference between the dual delay line output signals. This difference voltage 110 is then applied to a fixed gain operational amplifier 112 that multiplies the difference signal by a constant factor, sufficient to raise the difference voltage to a level more acceptable for comparison purposes. This amplified difference voltage 114 is then utilized as one input to two differential comparators 116 and 118 where it is applied to the positive input terminal of the amplifier 116 and to the negative input terminal of amplifier 118. Along with the amplified difference voltage 114, two other voltages 120 and 122 representing the permissible difference between the amplitudes of the delay line output signals are applied to the other input terminals of the differential comparators. As an example, if the limit of the differential of the attenuation between the output signals of the delay line is 2 percent of the input signal and the input signal is 2.0 volts peak-to-peak, a first adjustable voltage source 124 would be set to plus .4 volts and a second adjustable voltage source 126 would be set to a minus .4 volts. Assuming the amplified difference voltage 114 represents the difference voltage 112 multiplied by a factor of 10, .4 volts would in effect be equal to 2 percent of the input signal of 2.0 volts. Whenever the percentage difference between the amplitudes of the delay line output signal exceeds the specified limit, one of the differential amplifiers 116 or 118 will emit a signal through the OR gate 128 of FIG. 7 which will activate an indicator means such as a lamp 130 of FIG. 7, thereby indicating to an operator that the differences in the amplitude of the two delay line output signals 8 and 10 of FIG. 1 have exceeded specifications.

The foregoing is a description of the preferred embodiment of the out of phase signal comparison circuit wherein a signal in the range of 2 volts peak-to-peak and a frequency of 50 KHZ to 500 KHZ is used as input to a test device, i.e. a dual delay line. It should become quite apparent from the above description of the principles of the comparison circuitry that by adding circuit elements in parallel with those shown in FIGS. 3, 4, 5 and 6 that any number of devices may be tested by utilizing the principles herein disclosed. Similarly, by adding circuit elements in parallel with those shown in FIG. 7, the percentage difference between the amplitudes of any number of out of phase signals may be compared automatically.

To operate the preferred embodiment of the comparison circuitry for testing a large number of output signals, as would be required in a production environment, all that is necessary is to calibrate the various circuit elements as described. Initially, the resistors and capacitors 20 and 22 of FIG. 3 should be selected to approximate the ultimate impedance load to which the test device 4 of FIG. 1 will be connected. The next step is to adjust the voltage sources 64, 66, 60 and 67 as shown in FIG. 5 to compensate for any voltage drop across the filter and rectifier circuits shown in FIG. 4. The last step in calibrating the attenuation tester is to, by means of the adjustable voltage sources 96 and 98 of FIG. 6, set the limits that the output signals 8 and 10 may differ from the input signal 12. Concurrently, the adjustable voltage sources 124 and 126 shown in FIG. 7 should be set to reflect the allowable difference in amplitude between the outputs 8 and 10 of the test device. After the comparison circuitry has been thus calibrated, all that is necessary is to connect the test device to the comparison circuitry 2 and an input signal source 6, whereupon the indicating means 104 and 106 of FIG. 6 and 130 of FIG. 7 will serve to notify the operator if any of the output signals are attenuated beyond the selected specification. In this manner a large number of devices may be rapidly pass-fail tested to determine whether they meet attenuation specifications.

I claim:

1. An electronic circuit for comparing the amplitudes of a plurality of test signals comprising:
    means for adjusting the impedance load of the electronic test circuit to equal that of the ultimate application of each of the test signals;
    means for precise reproduction of each of the test signals;
    means for converting said reproduction of each test signal into its direct current components;
    voltage correction means to compensate for any loss in said direct current components in said converting means;
    summing means for combining each of said direct current components into a voltage representing the peak-to-peak output signal for each test signal;
    first comparator means for comparing each of said voltages representing a test signal to a direct current potential representing a reference signal;
    second comparator means for comparing said voltages representing the test signals to one another; and
    indicator means responding to predetermined settings of said first comparator means and said second comparator means effective to indicate when the amplitudes of the test signals do not fall within predetermined specifications.

2. An electronic test means as defined in claim 1 wherein said means for converting said reproduction of each of the test signals comprises a rectifier-filter circuit.

3. An electronic test means as defined in claim 1 wherein said voltage correction means comprises the combination of an adjustable voltage source to provide a compensating voltage; and
    a differential amplifier to combine said compensating voltage with said direct current component of said delay line output signals.

4. An electronic test means as defined in claim 1 wherein said summing means comprises a differential amplifier.

5. An electronic test means as defined in claim 1 wherein said first comparator means comprises:
    an adjustable voltage source; and
    a differential amplifier to compare the voltage from said adjustable source to said voltage representing the amplitude of a test signal.

6. An electronic test means as defined in claim 1 wherein said second comparator means comprises:
    a differential amplifier for each pair of said voltages representing the amplitude of test signals to produce a difference voltage representing the difference between said pair of voltages;
    an adjustable source of positive voltage;
    an adjustable source of negative voltage;
    means for comparing said differential voltage with said positive voltage; and
    means for comparing said differential voltage with said negative voltage.

* * * * *